(12) United States Patent
Khang (10) Patent No.: US 11,363,913 B2
(45) Date of Patent: Jun. 21, 2022

(54) AIR CIRCULATION-TYPE ELECTRIC ROASTER

(71) Applicant: Hyunho Khang, Chungchungbuk Do (KR)

(72) Inventor: Hyunho Khang, Chungchungbuk Do (KR)

( * ) Notice: Subject to any disclaimer, the term of this patent is extended or adjusted under 35 U.S.C. 154(b) by 781 days.

(21) Appl. No.: 16/244,733

(22) Filed: Jan. 10, 2019

(65) Prior Publication Data

US 2019/0142219 A1 May 16, 2019

Related U.S. Application Data

(63) Continuation of application No. PCT/KR2017/008047, filed on Jul. 26, 2017.

(30) Foreign Application Priority Data

Jul. 28, 2016 (KR) .................. 10-2016-0096406
Jul. 26, 2017 (JP) ...................... JP2017-144338
Jul. 26, 2017 (KR) .................. 10-2017-0094611

(51) Int. Cl.
*H05B 3/68* (2006.01)
*A47J 37/07* (2006.01)
(Continued)

(52) U.S. Cl.
CPC ............ *A47J 37/075* (2013.01); *A47J 37/04* (2013.01); *A47J 37/06* (2013.01); *A47J 37/0676* (2013.01);
(Continued)

(58) Field of Classification Search
CPC ... H05B 3/06; H05B 3/08; H05B 3/40; H05B 3/68; H05B 3/681; F24C 7/06; F24C 7/08;
(Continued)

(56) References Cited

FOREIGN PATENT DOCUMENTS

JP      H03-48874 Y2    10/1991
JP      2001-46238 A     2/2001
(Continued)

OTHER PUBLICATIONS

International Search Report for PCT/KR2017/008047 dated Nov. 7, 2017, citing the above reference(s).

*Primary Examiner* — Hung D Nguyen
(74) *Attorney, Agent, or Firm* — Hauptman Ham, LLP (57) ABSTRACT

Air circulation-type electric roaster includes body, air dispersing plate unit mounted on the body and including bottom plate having at least one through hole and first and second side plates formed respectively on both sides of the bottom plate and each having a plurality of ventholes, power supply unit including first and second power supply units, heating unit including first power connecting unit connected to the first power supply unit, air circulation unit arranged inner side of first long side of the body along its longitudinal direction and including second power connecting unit connected to the second power supply unit, body connecting unit mounted on first short side of the body and including first connecting terminal connected to the second power connecting unit and contactable with the second power supply unit, and cooking unit above the heating unit including cooking surface heated by the heating unit.

20 Claims, 6 Drawing Sheets

(51) Int. Cl.
    *H05B 3/40*     (2006.01)
    *A47J 37/06*     (2006.01)
    *A47J 37/04*     (2006.01)

(52) U.S. Cl.
    CPC ............ *A47J 37/07* (2013.01); *H05B 3/40* (2013.01); *H05B 3/68* (2013.01); *H05B 3/681* (2013.01)

(58) Field of Classification Search
    CPC ........ A47J 37/04; A47J 37/06; A47J 37/0641; A47J 37/0676; A47J 37/0694; A47J 37/07; A47J 37/0709; A47J 37/075; A47J 37/0754; A47J 37/0786
    USPC ... 219/443.1, 448.13, 448.17, 448.19, 450.1, 219/451.1, 465.1
    See application file for complete search history.

(56) References Cited

FOREIGN PATENT DOCUMENTS

| | | | | |
|---|---|---|---|---|
| JP | 2007-289649 | A | 11/2007 | |
| JP | 2012-170303 | A | 9/2012 | |
| KR | 20-0325441 | Y1 | 9/2003 | |
| KR | 2005-0002677 | A * | 1/2005 | |
| KR | 10-2007-0008383 | A | 1/2007 | |
| KR | 2007-0008383 | A * | 1/2007 | .......... A47J 37/0754 |
| KR | 10-0719854 | B1 | 5/2007 | |
| KR | 2010-0102810 | A * | 9/2010 | |
| KR | 10-2011-0052362 | A | 5/2011 | |
| KR | 10-2015-0146028 | A | 12/2015 | |
| WO | WO-2007007952 | A1 * | 1/2007 | .......... A47J 37/0694 |
| WO | WO-2018105942 | A1 * | 6/2018 | ................ F24C 7/06 |
| WO | WO-2019022296 | A1 * | 1/2019 | .............. A47J 37/06 |

\* cited by examiner

AIR CIRCULATION-TYPE ELECTRIC ROASTER

CROSS-REFERENCE TO RELATED APPLICATIONS

This application is a continuation of International Application No. PCT/KR2017/008047, filed Jul. 26, 2017, which is based upon and claims the benefit of priority from Korean Patent Application No. 10-2016-0096406, filed Jul. 28, 2016, Korean Patent Application No. 10-2017-0094611, filed Jul. 26, 2017, which is now Korean Patent No. 10-1852542, and Japanese Patent Application No. 2017-144338, filed Jul. 26, 2017, which is now Japanese Patent No. 6203981, the contents of which are incorporated herein by reference in their entirety.

BACKGROUND

1. Field

The present invention relates to an air circulation-type electric roaster.

2. Description of the Related Art

A typical electric roaster includes a cooking unit (cooking pan) and a heater, for cooking food materials such as meat, seafoods, vegetables, etc. on the cooking unit by applying electric power to the heater.

In a conventional electric roaster, an elongated fan is arranged on one side of the lower part of the body with a cooking unit arranged on the upper part. When cooking food materials, the fan is activated to generate a uniform air flow inside the electric roaster (see, for example, Korean Patent Application Laid-Open Publication No. 10-2007-0008383). This prevents smoke from being discharged to the outside, producing hot air flow inside the body, such that less smell is discharged to the outside, and at the same time, meat roasted in the cooking unit becomes smoked.

When activating a fan in the above manner, it is necessary to supply a separate direct-current (DC) power to a motor to rotate the fan and to supply an alternating-current (AC) power to the heater to heat the cooking unit. However, due to issues of certification, safety, and the like, it is required to use a power supply unit including a complicated circuit for supplying powers to the two power systems.

In addition, in the conventional electric roaster, the heater and the power supply are integrated with each other, which is inconvenient to use, and a complicated structure for supplying the DC power and the AC power is needed to respectively drive the motor and the heater.

Further, a safety device including a microswitch or the like is necessary to apply the electric power to the conventional electric roaster, which increases the number of necessary parts and wires, causing problems not only in manufacturing the electric roaster but also in the post-management aspect. This arises the need for a technology to minimize the number of such parts and wirings.

Moreover, the conventional electric roaster necessitates a cumbersome exchange of the cooking unit depending on food materials between a cooking unit for roasting, which has a plurality of through holes, and a solid standard cooking unit, which has no through holes.

The cooking unit for roasting has multiple through holes over almost the entire area thereof to let the oil fall down while establishing air flow channels, through which the air flow disrupts an airflow pressure balance or blasting pressure balance that needs to be maintained between the outlet side and the inlet side of an air dispersing plate unit. A solution to this deficiency requires side ventholes to be formed on the air dispersing plate unit with different sizes and numbers between the outlet side and the inlet side.

In addition, the air dispersing plate unit has its outlet side and inlet side generate a pressure difference between their discharge pressure and intake pressure, resulting in the near smokeless outlet side being occasionally overshadowed by somewhat smelly inlet side.

SUMMARY

According to some embodiments of the present invention, an air circulation-type electric roaster includes a body, an air dispersing plate unit configured to be mounted on the body, the air dispersing plate unit including a bottom plate having at least one through hole, a first side plate formed on a first side of the bottom plate, and a second side plate formed on both a second side of the bottom plate, each of the first side plate and the second side plate having a plurality of ventholes, a power supply unit including a first power supply unit and a second power supply unit, a heating unit including a first power connecting unit configured to be connected to the first power supply unit, a first air circulation unit arranged close to an inner side of a first long side of the body along a longitudinal direction thereof and including a second power connecting unit configured to be connected to the second power supply unit, a body connecting unit configured to be mounted on a first short side of the body in a direction perpendicular to the longitudinal direction and including a first connecting terminal configured to be connected to the second power connecting unit and contactable with the second power supply unit, and a cooking unit mounted above the heating unit and including a cooking surface configured to be heated by the heating unit. The power supply unit is configured to be connected to the body connecting unit in a detachable manner, and in a state in which the power supply unit is connected to the body connecting unit, a terminal included in the first power supply unit and a terminal included in the first power connecting unit are brought into contact with each other to electrically connect the power supply unit and the heating unit, and a terminal included in the second power supply unit and the first connecting terminal are brought into contact with each other to electrically connect the power supply unit and the first air circulation unit.

According to some embodiments of the present invention, an air circulation-type electric roaster includes a body, an air dispersing plate unit configured to be mounted on the body, the air dispersing plate unit including a bottom plate having at least one through hole, a first side plate formed on a first side of the bottom plate, and a second side plate formed on both a second side of the bottom plate, each of the first side plate and the second side plate having a plurality of ventholes, a power supply unit including a first power supply unit and a second power supply unit, a heating unit including a first power connecting unit configured to be connected to the first power supply unit, an air circulation unit arranged close to an inner side of a first side of the body along a longitudinal direction of the body and including a second power connecting unit configured to be connected to the second power supply unit, a body connecting unit configured to be mounted on a first side of the body in a direction perpendicular to the longitudinal direction of the body and including a connecting terminal configured to be connected to the second power connecting unit and contactable with the second power supply unit, and a cooking unit mounted above the heating unit and configured to be heated by the heating unit. The air dispersing plate unit is configured to determine an elevation of the first power connecting unit so that, in a state in which the power supply unit is connected to the body connecting unit, the terminal included in the first power supply unit and the terminal included in the first power connecting unit are brought into contact with each other.

According to some embodiments of the present invention, an air circulation-type electric roaster includes a body, an air dispersing plate unit configured to be mounted on the body, the air dispersing plate unit including a bottom plate having at least one through hole, a first side plate formed on a first side of the bottom plate, and a second side plate formed on both a second side of the bottom plate, each of the first side plate and the second side plate having a plurality of ventholes, a power supply unit including a first power supply unit and a second power supply unit, a heating unit including a first power connecting unit configured to be connected to the first power supply unit, an air circulation unit arranged along a first long side of the body in a longitudinal direction thereof and including a second power connecting unit configured to be connected to the second power supply unit, a body connecting unit configured to be mounted on a first short side of the body in a direction perpendicular to the longitudinal direction and including a first connecting terminal configured to be connected to the second power connecting unit and contactable with the second power supply unit, and a cooking unit mounted above the heating unit and including a cooking surface configured to be heated by the heating unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present disclosure are described in detail below with reference to the accompanying drawings. In the following descriptions, like reference numerals designate like elements although the elements are shown in different drawings. Further, detailed descriptions of known functions and configurations incorporated herein are omitted for the purpose of clarity and for brevity.

The detailed description provided below with the accompanying drawings is to instantiate exemplary embodiments of the present invention, which should not be deemed to describe the only embodiment that can be achieved by the present disclosure.

It is an object of the present invention to provide an air circulation-type electric roaster that can independently supply power to a cooking unit and an air circulation unit by separating a power supply unit and a heater.

Further, it is another object of the present invention to provide an air circulation-type electric roaster that can suppress the occurrence of problems not only at the time of manufacturing but also in terms of maintenance by reducing the number of parts and wires required for safety.

Moreover, it is still another object of the present invention to provide an air circulation-type electric roaster that can resolve inconveniences of changing cooking units depending on food materials by integrating two cooking units including a cooking unit for roasting, which has a plurality of through holes, and a standard cooking unit, which has no through holes.

Further, it is still another object of the present invention to provide an air circulation-type electric roaster that produces virtually no smell on both the inlet side and the outlet side of the air dispersing plate unit by stabilizing the blasting pressure balance between the inlet side and the outlet side.

The technical problems to be solved by the present disclosure are not limited to the above-mentioned, and other technical problems not mentioned herein can be clearly understood by one of ordinary skill in the pertinent art from the following descriptions.

Figure 1:
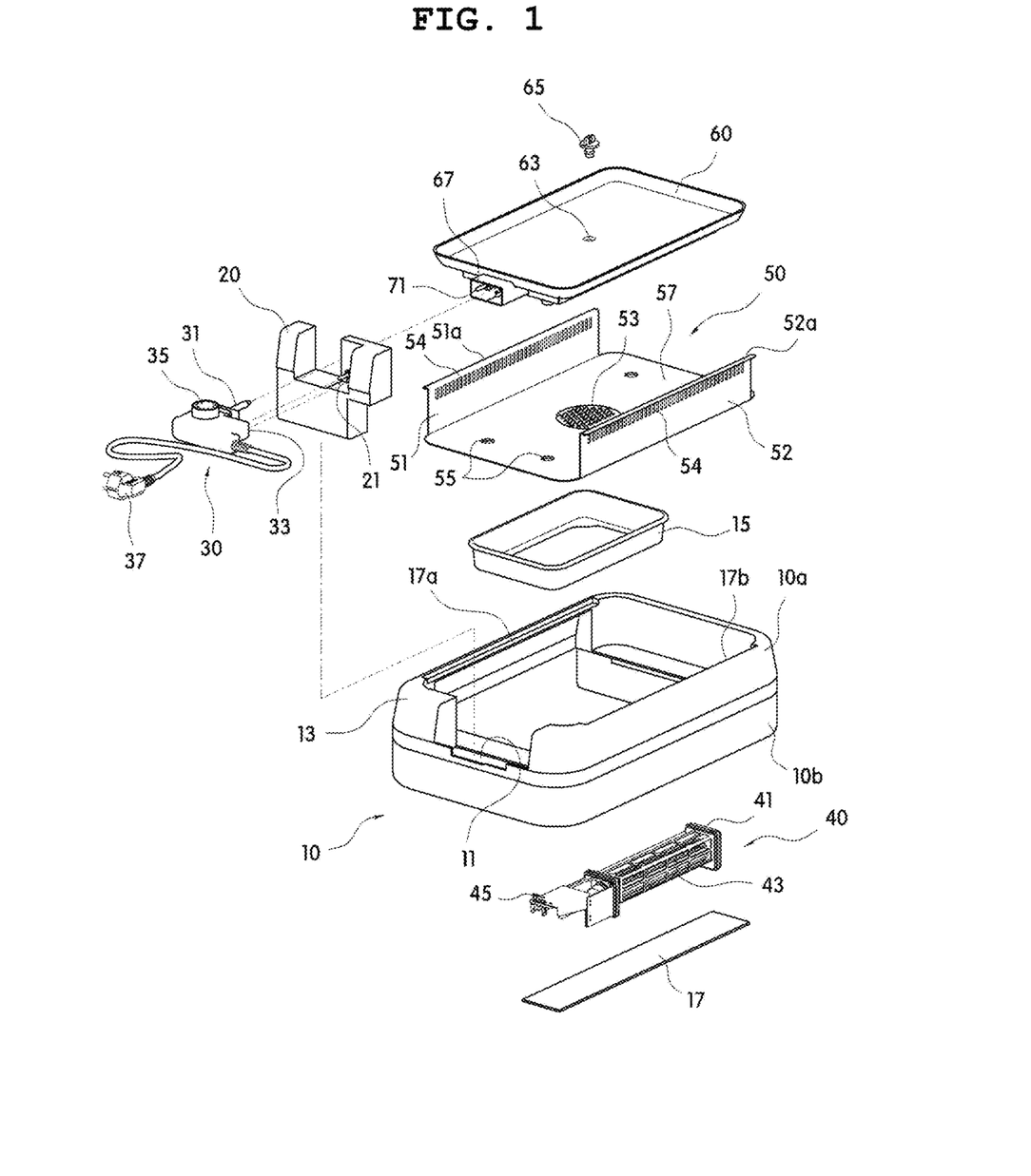
FIG. 1 is an exploded perspective view of an air circulation-type electric roaster according to some embodiments of the present invention.
Figure 2:
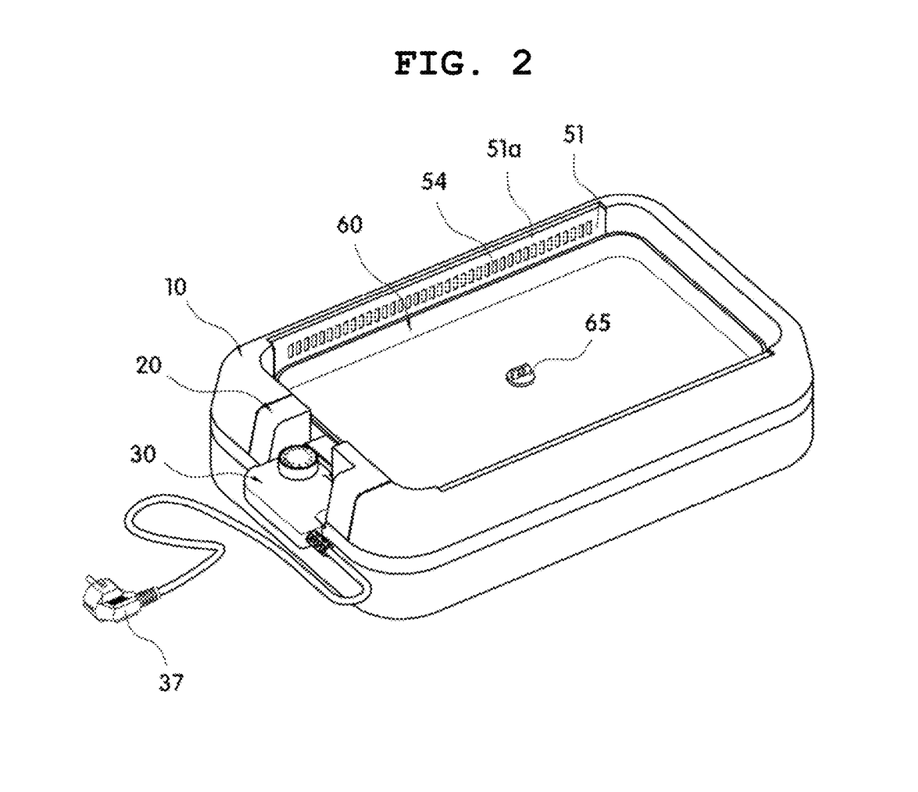
FIG. 2 is a perspective view of the air circulation-type electric roaster according to some embodiments of the present invention.
Figure 3:
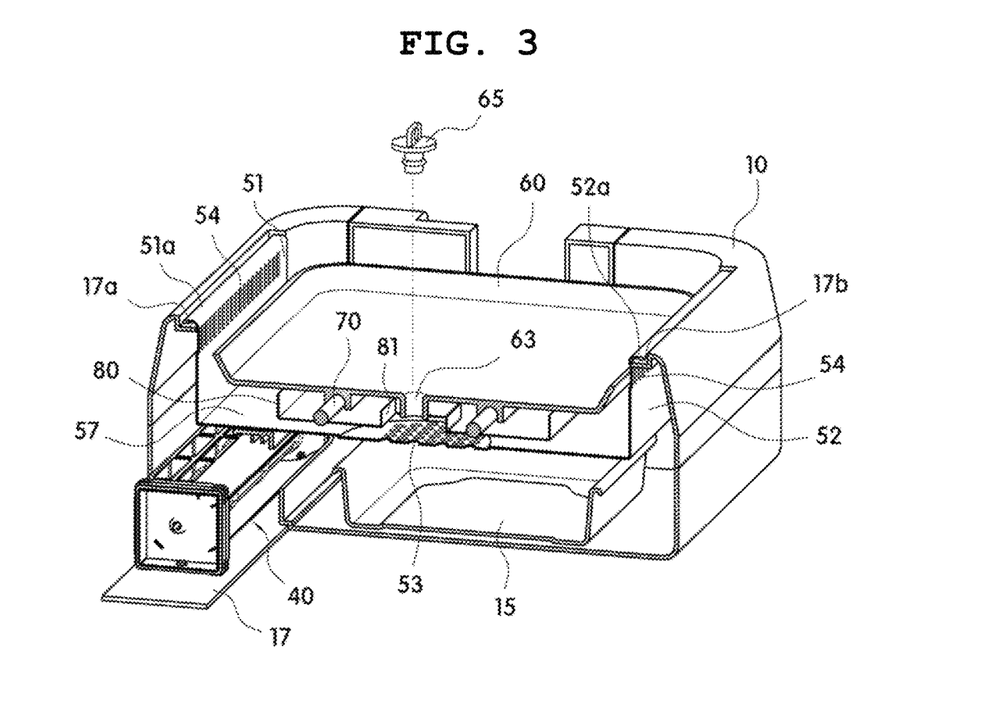
FIG. 3 is a side cross-sectional view of the air circulation-type electric roaster according to some embodiments of the present invention.

FIG. 1 is an exploded perspective view of an air circulation-type electric roaster according to some embodiments of the present invention. FIG. 2 is a perspective view of the air circulation-type electric roaster according to some embodiments of the present invention. FIG. 3 is a side cross-sectional view of the air circulation-type electric roaster according to some embodiments of the present invention.

As shown in FIGS. 1 and 3, the air circulation-type electric roaster according to some embodiments of the present invention includes a body 10, an air circulation unit 40, a cooking unit 60, a heating unit (heater) 70, a lower cover unit 80, an air dispersing plate unit 50, an oil pan unit 15, a power supply unit 30, and a body connecting unit 20.

As shown in FIGS. 1 and 2, the body 10 is laid on a flat surface such as a table or floor, and includes various components inside to provide the overall appearance of the air circulation-type electric roaster according to some embodiments of the present invention.

The air circulation unit 40 is provided on a lower side of the body 10, and upwardly thereof, the oil pan unit 15, air dispersing plate unit 50, lower cover unit 80, heating unit 70, and cooking unit 60 are seated in this order. In some embodiments of the present invention, a fan 43 is embedded in the air circulation unit 40 mounted within the body 10, to circulate the air inside through the operation of the fan 43, thereby preventing oil molecules or other matters from leaking out of the body 10.

The body 10 may be formed integrally, or it may be composed of an upper portion 10a and a lower portion 10b which can be detachably coupled to each other to provide convenience in washing.

As shown in FIG. 1, the air circulation unit 40 is formed in an elongated shape, is installed at a lower side of the body 10, and includes a case 41, the fan 43, and a second power connecting unit 45.

The fan 43 is detachably installed inside the case 41 of the elongated air circulation unit 40. The fan 43 may be inserted and separated in and from the body 10 by opening a bottom part 17 located on the bottom surface of the body 10. The fan 43 may be inserted and separated through the inside of the door the body 10 in addition to opening and closing the door bottom part 17. The fan 43 is linked to and driven by a motor (not shown) when operated.

The rotation of the fan 43 prevents air in the air circulation-type electric roaster from flowing out to the outside, and keeps it circulated inside. The air circulation unit 40 is mounted on the bottom of the body 10, and the second power connecting unit 45 is connected to the output of an internal transducer (not shown) of the body connecting unit 20. In this way, the DC power is supplied through the second power connecting unit 45, to operate the fan 43.

Figure 4:
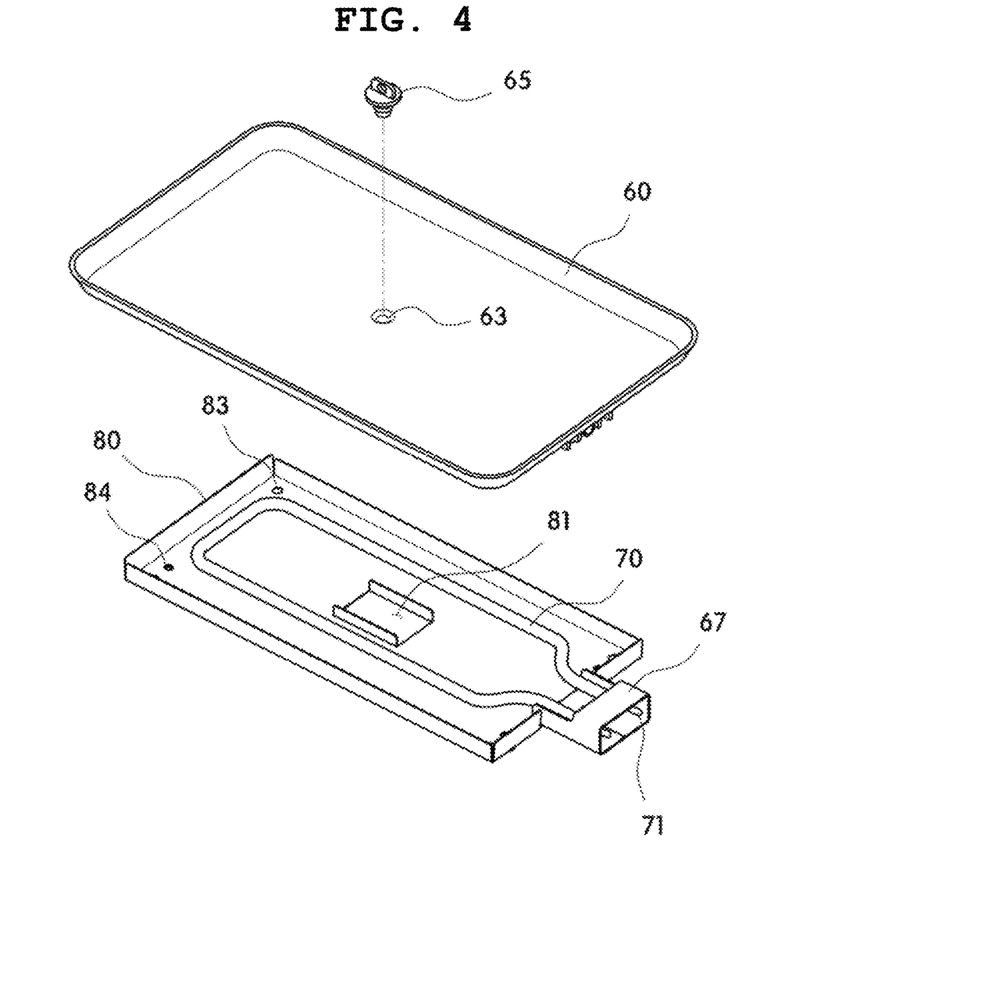
FIG. 4 is an exploded perspective view of a cooking unit, a heating unit, and a lower cover unit of the air circulation-type electric roaster according to some embodiments of the present invention viewed from above.
Figure 5:
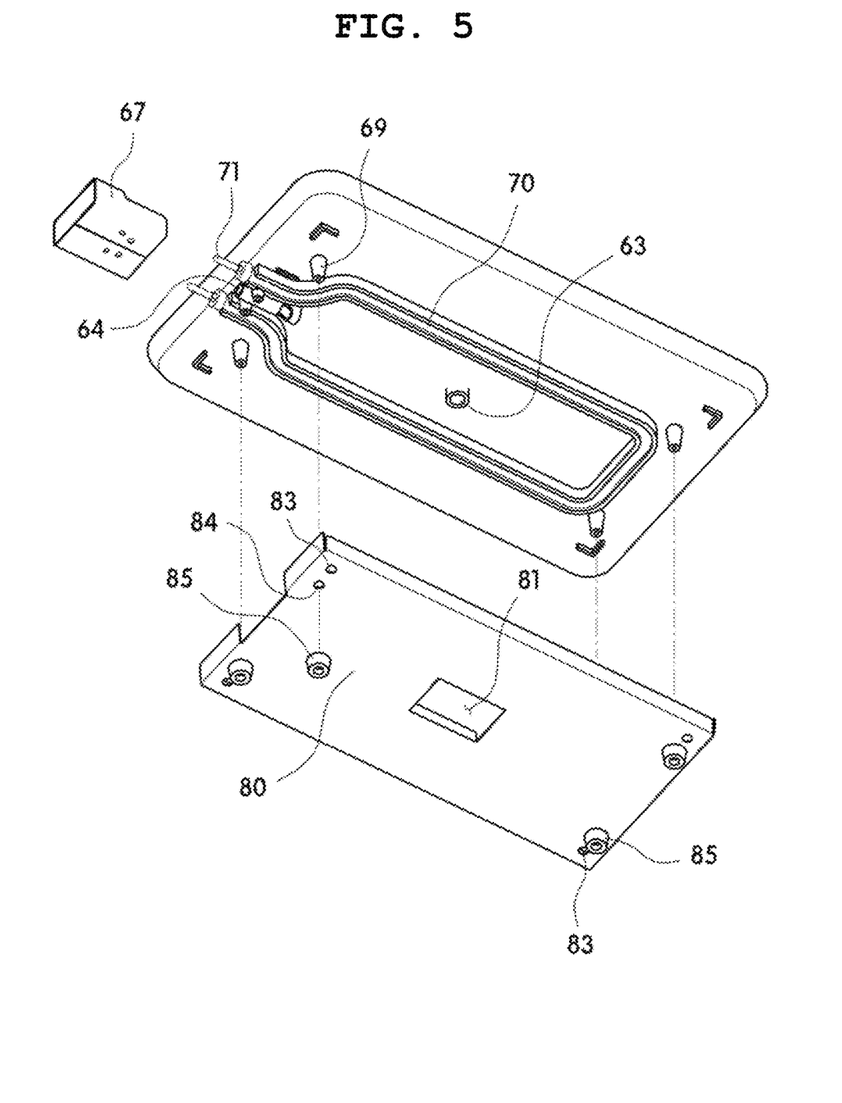
FIG. 5 is an exploded perspective view of a cooking unit, a heating unit, and a lower cover unit of the air circulation-type electric roaster according to some embodiments of the present invention viewed from below.

FIG. 4 is an exploded perspective view of a cooking unit, a heating unit, and a lower cover unit of the air circulation-type electric roaster according to some embodiments of the present invention viewed from above. FIG. 5 is an exploded perspective view of a cooking unit, a heating unit, and a lower cover unit of the air circulation-type electric roaster according to some embodiments of the present invention viewed from below.

As shown in FIGS. 3 to 5, the cooking unit 60 provides an area for cooking various kinds of food materials such as meat, seafood, vegetables, and the like. In addition, the cooking unit 60 is centrally formed with a through hole 63. The bottom surface (cooking surface) of the cooking unit 60 is formed to be inclined from its edges to the through hole 63 at the center, so that the oil generated at the cooking can easily flow along the bottom surface to the through hole 63. Although FIGS. 3 to 5 illustrate the single through hole 63, the number and shape of the through hole 63 to be formed are not limited to a specific number and shape, and they may be set as needed.

In addition, the through hole 63 may be opened and closed with a cover member 65 when plugged in the through hole 63. The cover member 65 may be unplugged when cooking greasy meat to remove the oil with the exposed through hole 63, and the cover member 65 may plug the through hole 63 when preparing such food material that does not require the discharge of oil. In this way, the use of the cover member 65 saves the hassle of changing the cooking unit 60 dependent on the application.

In some embodiments of the present invention, the inner surface of the through hole 63 is formed as a nut section, and the cover member 65 has a bolt section at its outer surface portion inserted into the through hole 63, and a turning knob formed on the opposite end of the bolt section, to turn the cover member 65 to close the through hole 63 without using a driver or other tools. In this case, the knob may be made detachable from the cover member 65 once it securely plugs into the through hole 63 out of the way for cooking.

There are occasions in the process of cooking that started with the through hole 63 closed by the cover member 65, to clear the cover member 65 out from the through hole 63. To this end, a cross or a straight driver groove or a polygonal wrench groove may be formed in the upper part of the knob, so that a driver, wrench or such tool may be used to drive out the cover member 65 backward or forward until it falls on the air dispersing plate unit 50 below.

In some embodiments of the present invention, the inner surface of the through hole 63 is formed as a nut section, and the cover member 65 has a bolt section at its outer surface portion inserted into the through hole 63, and instead of a turning knob, a cross or a straight driver groove or a polygonal wrench groove may be formed on the opposite end of the bolt section. The omission of a protrusive knob member in this arrangement out of the way for cooking will offset the need for a driver, wrench or other tools with the cover member 65 to close the through hole 63. Likewise, when the cooking process, which started with the through hole 63 closed by the cover member 65, needs to clear the cover member 65 out from the through hole 63, a driver, wrench or such tool may be used to drive out the cover member 65 backward or forward until it falls on the air dispersing plate unit 50 below.

It is shown in FIG. 4 to close the through hole 63 with the cover member 65 above the cooking unit 60, although in some embodiments of the invention, it may be configured to block the through hole 63 from below the cooking unit 60. In this case, the cover member 65 may have its length so determined that the cover member 65 is driven to its forwardmost position without protruding beyond the bottom surface (cooking surface) of the cooking unit 60. In such embodiments, the cover member 65 is formed with a cross or a straight driver groove or a polygonal wrench groove, at its end that is exposed to the bottom surface (cooking surface) of the cooking unit 60. This allows, as needed by the cooking process started with the through hole 63 closed by the cover member 65, the cover member 65 to be cleared out from the through hole 63 with a driver, wrench or such tool used to drive the cover member 65 to its backward most position until it falls on the air dispersing plate unit 50 below.

In some embodiments of the invention, the inner surface of the through hole 63 is formed in a tapered shape with its diameter decreased from top to bottom, and the cover member 65 has the corresponding tapered section at its outer surface portion inserted into the through hole 63, so that the cover member 65 when correctly dropped into the through hole 63 is analogous to a cork stopper for simply closing the through hole 63. In such embodiments, too, the length of the cover member 65 may be determined such that the cover member 65 when closing the through hole 63 does not protrude over the upper sheet surface of the cooking unit 60.

In some embodiments of the present invention, the body 10 may be partially formed with a storage room (not shown) for securely housing the cover member 65 when not in use.

As shown in FIGS. 3 to 5, the heating unit 70 has a linear heating element arranged in a plane. With a wider linear heating element arranged in a plane, more even heat distribution is provided over the cooking unit 60. Here, the heating unit 70 may have a zigzag shape.

In addition, the heating unit 70 includes a first power connecting unit 71 formed at one side, through which it receives a supplied power. The heating unit 70 may further include a guide unit 67 formed to surround the first power connecting unit 71.

The guide unit 67 has an internal step formation which serves, in the process of connecting the power supply unit 30 to the cooking unit 60, to securely hold the power supply unit 30. This can prevent accidental electric shocks due to the current flowing through the first power connecting unit 71.

The cooking unit 60 may have its bottom formed with the heating unit 70 attached, or the cooking unit 60 may be formed separate from the heating unit 70 which is detachably attached to the cooking unit 60. According to some embodiments of the present invention, when the cooking unit 60 and the heating unit 70 are attached and formed together, the reduced number of parts provides convenient storage thereof. According to another embodiment of the present invention, the cooking unit 60 and the heating unit 70 when formed to be detachably attached to each other, are advantageous in facilitating cleaning thereof.

As shown in FIGS. 4 and 5, the lower cover unit 80 may be positioned under the cooking unit 60 to surround the lower portion of the heating unit 70. The lower cover unit 80 is planar and surrounding the lower portion of the heating unit 70 to serve as a heat shield, resulting in an increased internal thermal efficiency of the air circulation-type electric roaster according to some embodiments.

As shown in FIG. 4, the lower cover unit 80 is centrally formed with a lower cover hole 81 that is aligned with the through hole 63 formed in the cooking unit 60 to allow a vertical penetration through the two holes for discharging oil flowing from the cooking unit 60.

Meanwhile, a plurality of connecting members 69 is formed on the bottom surface of the cooking unit 60, and the lower cover unit 80 is formed with a plurality of the ventholes 83 and a plurality of coupling holes 84. The connecting members 69 has an appropriate length to secure a space enough to hold the heating unit 70 between the cooking unit 60 and the lower cover unit 80.

As shown in FIG. 5, four connecting members 69 may be arranged at the corners of the cooking unit 60, extending at 90 degrees from its surface. The lower cover unit 80 is formed with four coupling holes 84 at its positions corresponding to the four connecting members 69 so that the connecting members 69 passing through the coupling holes 84 may be fixed by fixing members 85.

At this time, the connecting members 69 penetrating the coupling holes 84 may be fastened to the fixing members 85 by using bolts. In addition, the lower cover unit 80 may be further formed with ventholes 83 beside the coupling holes 84, to provide ventilation therethrough.

As shown in FIGS. 1 to 3, seated on the body 10 is the air dispersing plate unit 50, above which are placed the lower cover unit 80, the heating unit 70, and the cooking unit 60 in this order.

As shown in FIGS. 1 and 3, the air dispersing plate unit 50 may include a first side plate 51, a second side plate 52, and a bottom plate 57. The bottom plate 57 forms a lower bottom with the first side plate 51 and 52 being formed on both sides.

As shown in FIGS. 1 to 3, the first side plate 51 and the second side plate 52 are generally planar, and with a plurality of ventholes 54 formed to allow air to flow in and out.

In addition, the first side plate 51 and the second side plate 52 may be separately formed so as to be detachably attached to the bottom plate 57 of the air dispersing plate unit 50, or they may be integrally formed with the bottom plate 57. The first side plate 51 and the second side plate 52 are respectively formed at their upper ends with flange portions 51a and 52a which conform to and mate with step portions 17a and 17b formed on top of the body 10.

In some embodiments, the first side plate 51 and the second side plate 52 are formed on both sides of the bottom plate 57 in the longitudinal direction, and they have corner side portions formed to be curved in opposite directions with respect to the longitudinal direction.

In some embodiments, the first side plate 51 and the second side plate 52 have both ends thereof formed to be planar, and are seated so as to abut corners 13 of the body 10. The planar shape of the first side plate 51 and the second side plate 52 provides a simpler manufacturing process than when they have curved corner side portions, saving the machining cost, which is economically advantageous.

In addition, the bottom plate 57 may be formed with a discharge hole 53 and seating holes 55. The bottom plate 57 may be formed to be inclined from its edges to the discharge hole 53 at the center.

The discharge hole 53 may be formed at the center of the bottom plate 57 of the air dispersing plate unit 50. The discharge hole 53 allows oil to exit after it is discharged from the through hole 63 of the cooking unit 60, while allowing the air to move in and out therethrough. There may be multiples of the discharge hole 53, which are circular, square, or other shapes. Although FIG. 1 illustrates that the discharge hole 53 is formed at the center of the bottom plate 57 of the air dispersing plate unit 50, the position of the discharge hole 53 may be appropriately set according to the position of the oil pan unit 15 below.

Meanwhile, located near the edge portions of the bottom plate 57 are the seating holes 55 in which the connecting members 69 positioned below the cooking unit 60 are seated and settled. Alternatively, the seating holes 55 may not be formed in the bottom plate 57.

As described above, unlike the conventional air circulation-type electric roaster in which the oil drops through the plurality of through holes all over the entire planar surface of the cooking unit 60, some embodiments provides the cooking unit 60 with the centrally positioned through hole 63 for generating a concentrated downflow of oil, which reduces the air flow path in the vertical direction inside the air circulation-type electric roaster, affecting less on the blasting pressure balance between the outlet side and the inlet side of the air dispersing plate unit 50.

Figure 6:
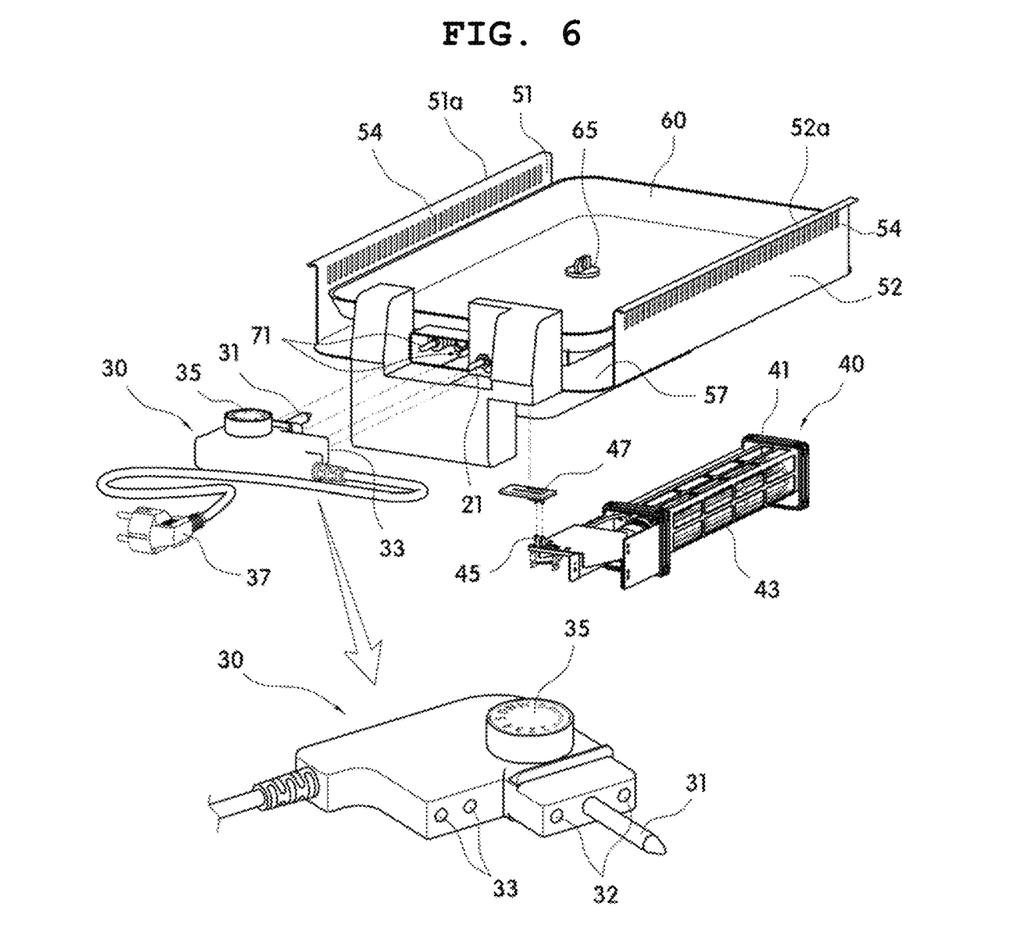
FIG. 6 is an exploded perspective view of a power supply unit, a first power connecting unit, and a second power connecting unit of the air circulation-type electric roaster according to some embodiments of the present invention.

As shown in FIGS. 1, 2 and 6, some embodiments of the present invention take advantage of the arrangement that the air dispersing plate unit 50 is placed on the body 10, with the flange portions 51a, 52a formed on the air dispersing plate unit 50 at the upper ends of the first side plate 51 and the second side plate 52 being seated on the step portions 17a and 17b formed on top of the body 10. The seating of the air dispersing plate unit 50 by the flange portions 51a, 52a on the step portions 17a and 17b of the body 10 serves to determine the elevation of the first power connecting unit 71 by supporting the lower cover unit 80, the heating unit 70, and the cooking unit 60, when the body connecting unit 20 is coupled, so that the first power connecting unit 71 passes through an upper groove of the body connecting unit 20 to connect with the power supply unit 30.

Therefore, no mounting or improper mounting of the air dispersing plate unit 50 vertically misplaces the three members of lower cover unit 80, heating unit 70, and cooking unit 60 out of their correct elevations within the body 10 to prevent the first power connecting unit 71 from connecting to the power supply unit 30 via the upper groove of the body connecting unit 20, and thereby prevents an unsafe supply of electric power, obviating the need for a separate safety device.

As shown in FIGS. 1 and 3, the oil pan unit 15 is seated inside the body 10 to store the oil discharged from the cooking unit 60. The oil pan unit 15 according to some embodiments of the present invention is detachably attached to the body 10 to provide ease of collection and cleaning of waste oil.

In some embodiments of the invention, the body 10 is integrally formed with the oil pan unit 15 which is then formed with a separate waste oil outlet. In addition, the oil pan unit 15 may be arranged as a drawer so as to discharge the waste oil to the outside through the lower side of the body 10.

As shown in FIG. 6, the body connecting unit 20 may be inserted and mounted on one side of the body 10, and it includes an internal transducer (not shown) for performing AC-DC conversion. The body connecting unit 20 is coupled to the power supply unit 30 and inserted into one side portion of the body 10.

In addition, the power supply unit 30 may include a temperature sensing pin 31, a first power supply unit 32, a second power supply unit 33, a temperature control unit 35, and a power plug 37.

The power supply unit 30 has the temperature sensing pin 31 inserted thereto, and into a receptacle 64 attached to the lower surface of the cooking unit 60. Here, the temperature sensing pin 31 serves to sense the temperature of the cooking unit 60 by connecting the cooking unit 60 and the power supply unit 30 to each other.

Temperature rise of the cooking unit 60 at or above a predetermined temperature value shuts off the power supply by the operation of a bimetal installed inside of the chamber 30, while temperature fall thereof at or above the predetermined temperature value supplies the power. The power supply unit 30 may be operated by analog sensing of the temperature according to the operation of the bimetal following temperature change, or by digital sensing of the temperature to detect a current or voltage change in temperature sensing pin 31.

In addition, the power supply unit 30 may include temperature control unit 35 for directly controlling the temperature of the cooking unit 60. The power supply unit 30 is detachably attached to the body connecting unit 20, when the first power supply unit 32 has its embedded terminals connected to the corresponding terminals embedded in the first power connecting unit 71, thereby electrically connecting the power supply unit 30 and the heating unit 70 to each other. In addition, the terminal included in the second power supply unit 33 has its embedded terminals that come to contact with connection pins 21 which are the first connection terminals, whereby electrically connecting the power supply unit 30 and the air circulation unit 40 to each other.

The air circulation-type electric roaster according to some embodiments of the present invention is configured so that the first power supply unit 32 of the power supply unit 30 is connected to the first power connecting unit 71 connected to one side of the heating unit 70.

In addition, the second power supply unit 33 of the power supply unit 30 is connected to the connecting pins 21 of the body connecting unit 20 and further to a coupling plate 47 and a second power connecting unit 45. The body connecting unit 20 may include an internal transducer for performing AC-DC conversion on the power supplied through the second power supply unit 33.

Therefore, the converted DC power through the transducer or the AC power drives the motor of the fan 43 through the second power connecting unit 45. The power supply unit 30 may have a separate switch for turning on/off the power supplied between the second power supply unit 33 and the second power connecting unit 45.

Accordingly, power is supplied to the single power supply unit 30, to energize the cooking unit 60 through the first power supply unit 32, and to drive the fan 43 through the second power supply unit 33 and via the body connecting unit 20, respectively.

In this way, the power supply unit 30 and the heating unit 70 are spatially separated to electrically connect the power supply unit 30 and the heating unit 70 through the contact between the terminals in the first power supply unit 32 and the terminals in the first power connecting unit 71. Accordingly, the air circulation-type electric roaster according to some embodiments provides more simplified power supply arrangement compared to the conventional air circulation-type electric roaster, which takes a complicated circuit configuration and employs a power supply device, which is inseparable from a heater, for powering the relevant fan.

The air circulation-type electric roaster according to some embodiments of the present invention configured so that the lower end portion of the body connecting unit 20 is inserted and fixed into a seat portion 11 formed in the body 10.

At this time, the body connecting unit 20 may be formed separately from the body 10, or they may be integrally formed. Separately formed, they facilitate the cleaning job, and the integral formation leads to a reduced number of parts.

Although FIG. 6 illustrates that the body connecting unit 20 includes a transducer (not shown) for converting an alternating current to a direct current, such a transducer for AC-to-DC conversion is installed in the power supply unit 30 in some embodiments of the present invention. The latter case allows the power supply system to be completely separated from the body connecting unit 20, which saves the trouble of disassembling the entire air circulation-type electric roaster into pieces just by removing the power supply unit 30 and the air circulation unit 40.

Although FIGS. 1 and 2 illustrate that the power supply unit 30 is connected straight to the air circulation-type electric roaster past the body connecting unit 20, some embodiments of the present invention envision that the power supply unit 30 be partially modified into a predetermined length of extension wire leading to the opposite direction of the power plug 37, which will isolate the principal body of the power supply unit 30 from the air circulation-type electric roaster. This effects the complete isolation of the power supply unit 30 from the high-temperature air circulation-type electric roaster, to promote the safe use thereof.

The air circulation-type electric roaster according to some embodiments as illustrated in FIG. 1, operates to cook, for example, meat on the cooking unit 60, where the ventholes 54 in the first side plate 51 of the air dispersing plate unit 50 intake the external air and smoke that will flow in the interior of the air circulation unit 40 and down to the inner space under the body 10.

A portion of the introduced outside air passes through the central discharge hole 53 of the air dispersing plate unit 50, traveling up to follow the through hole 63, and the remaining air is discharged through the ventholes 54 in the second side plate 52 of the air dispersing plate unit 50, climbing to the top of the body 10 at a constant rate.

The air discharged through the ventholes 54 in the second side plate 52 of the air dispersing plate unit 50 is forcibly introduced back into ventholes 54 in the first side plate 51 by the operation of the fan 43. The same air flow is repeated.

Therefore, the aforementioned air flow establishes natural air curtains on the upper portion of the body 10 to suppress the discharge of oil fumes and odors generated when the meat is roasted.

Although FIGS. 1, 2, and 3 illustrate the air circulation unit 40 as singularly installed on a lower side of the body 10, some embodiments of the present invention envision a first air circulation unit 40 to be installed on a lower side of the body 10 and a second air circulation unit 40 to be installed on the opposite side thereof, so that the first one is mainly responsible for the intake operation and the second one assumes the discharge operation. In such embodiments, the second air circulation unit 40 installed on that opposite side includes a third power connecting unit (not shown) connected with second power supply unit 33. Operating the first outlet-side air circulation unit 40 at the same power level as that of the second inlet-side air circulation unit 40, or boosting the outlet-side air circulation unit 40 over the inlet-side air circulation unit 40 provides an air circulation-type electric roaster generating almost no odor on both the outlet side and the inlet side at the time of cooking.

According to some embodiments of the present invention, in an air circulation-type electric roaster, power can be independently supplied to a cooking unit and an air circulation unit with a simplified structure by separating a power supply unit and a heater.

Further, according to some embodiments of the present invention, in an air circulation-type electric roaster occurrence of problems can be suppressed not only at the time of manufacturing but also in terms of maintenance by reducing the number of parts and wires required for safety.

Moreover, according to some embodiments of the present invention, in an air circulation-type electric roaster, inconveniences of changing cooking units depending on food materials can be resolved by integrating two cooking units including a cooking unit for roasting, which has a plurality of through holes, and a standard cooking unit, which has no through holes.

Further, according to some embodiments of the present invention, in an air circulation-type electric roaster, virtually no smell can be produced on both an inlet side and an outlet side by an equivalent extent by stabilizing the blasting pressure balance between the inlet side and the outlet side of the air dispersing plate unit.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. An air circulation-type electric roaster, comprising:
a body;
an air dispersing plate unit configured to be mounted on the body, the air dispersing plate unit including a bottom plate having at least one through hole, a first side plate formed on a first side of the bottom plate, and a second side plate formed on both a second side of the bottom plate, each of the first side plate and the second side plate having a plurality of ventholes;
a power supply unit including a first power supply unit and a second power supply unit;
a heating unit including a first power connecting unit configured to be connected to the first power supply unit;
a first air circulation unit arranged close to an inner side of a first long side of the body along its longitudinal direction and including a second power connecting unit configured to be connected to the second power supply unit;
a body connecting unit configured to be mounted on a first short side of the body in a direction perpendicular to the longitudinal direction and including a first connecting terminal configured to be connected to the second power connecting unit and contactable with the second power supply unit; and
a cooking unit mounted above the heating unit and including a cooking surface configured to be heated by the heating unit, wherein
the power supply unit is configured to be connected to the body connecting unit in a detachable manner, and in a state in which the power supply unit is connected to the body connecting unit, a terminal included in the first power supply unit and a terminal included in the first power connecting unit are brought into contact with each other to electrically connect the power supply unit and the heating unit, and a terminal included in the second power supply unit and the first connecting terminal are brought into contact with each other to electrically connect the power supply unit and the first air circulation unit.

2. The air circulation-type electric roaster according to claim 1, wherein
the second power supply unit is configured to supply an alternating current, and
the body connecting unit includes a transducer that converts the alternating current supplied from the second power supply unit to a direct current.

3. The air circulation-type electric roaster according to claim 1, wherein the second power supply unit includes a transducer for converting an alternating current to a direct current, and supplies the direct current to the second power connecting unit through the body connecting unit.

4. The air circulation-type electric roaster according to claim 1, wherein the power supply unit further includes a temperature control unit for adjusting a temperature of the heating unit.

5. The air circulation-type electric roaster according to claim 1, wherein the air dispersing plate unit is configured to determine an elevation of the first power connecting unit so that, in a state in which the power supply unit is connected to the body connecting unit, the terminal included in the first power supply unit and the terminal included in the first power connecting unit are brought into contact with each other.

6. The air circulation-type electric roaster according to claim 1, wherein
the cooking unit includes at least one through hole formed in at least a part of the cooking surface, and
the air circulation-type electric roaster further has a cover member capable of opening and closing the at least one through hole.

7. The air circulation-type electric roaster according to claim 6, wherein
the through hole has an inner peripheral surface formed as a nut portion, and
the cover member has at one side an outer circumferential surface formed as a bolt portion which includes an insertion section to be inserted into the nut portion of the through hole, and a knob at the other side, for turning the cover member.

8. The air circulation-type electric roaster according to claim 7, wherein the knob of the cover member or the bolt portion is terminally formed with a cross or a straight driver groove or a polygonal wrench groove.

9. The air circulation-type electric roaster according to claim 1, further comprising:
 a second air circulation unit arranged close to an inner side of a second side of the body along the longitudinal direction of the body and including a third power connecting unit configured to be connected to the second power supply unit, and wherein
 the body connecting unit further includes a second connecting terminal configured to be connected to the third power connecting unit and contactable with the second power supply unit,
 in a state in which the power supply unit is connected to the body connecting unit, the terminal included in the second power supply unit and the second connecting terminal are brought into contact with each other to electrically connect the power supply unit and the second air circulation unit, and
 the first air circulation unit and the second air circulation unit are operated at a common power level or at different power levels respectively according to an electric power supplied by the second power supply unit.

10. The air circulation-type electric roaster according to claim 1, wherein the heating unit is attached to a bottom of the cooking unit.

11. The air circulation-type electric roaster according to claim 10, wherein the heating unit is formed in an integrated manner with the cooking unit.

12. The air circulation-type electric roaster according to claim 10, wherein the heating unit is attached to the bottom of the cooking unit in a removable manner.

13. The air circulation-type electric roaster according to claim 1, further comprising a guide unit enclosing the first power connecting unit.

14. The air circulation-type electric roaster according to claim 1, wherein the power supply unit and the heating unit are spatially separated by the body connecting unit.

15. The air circulation-type electric roaster according to claim 1, wherein the body connecting unit is separately provided from the body.

16. The air circulation-type electric roaster according to claim 1, wherein the body connecting unit is formed in an integrated manner with the body.

17. The air circulation-type electric roaster according to claim 1, further comprising a lower cover unit configured to cover a bottom portion of the heating unit.

18. The air circulation-type electric roaster according to claim 1, further comprising an oil pan unit mounted inside the body and configured to receive oil discharged from the cooking unit.

19. An air circulation-type electric roaster, comprising:
 a body;
 an air dispersing plate unit configured to be mounted on the body, the air dispersing plate unit including a bottom plate having at least one through hole, a first side plate formed on a first side of the bottom plate, and a second side plate formed on both a second side of the bottom plate, each of the first side plate and the second side plate having a plurality of ventholes;
 a power supply unit including a first power supply unit and a second power supply unit;
 a heating unit including a first power connecting unit configured to be connected to the first power supply unit;
 an air circulation unit arranged close to an inner side of a first side of the body along a longitudinal direction of the body and including a second power connecting unit configured to be connected to the second power supply unit;
 a body connecting unit configured to be mounted on a first side of the body in a direction perpendicular to the longitudinal direction of the body and including a connecting terminal configured to be connected to the second power connecting unit and contactable with the second power supply unit; and
 a cooking unit mounted above the heating unit and configured to be heated by the heating unit, wherein
 the air dispersing plate unit is configured to determine an elevation of the first power connecting unit so that, in a state in which the power supply unit is connected to the body connecting unit, a terminal included in the first power supply unit and a terminal included in the first power connecting unit are brought into contact with each other.

20. An air circulation-type electric roaster, comprising:
 a body;
 an air dispersing plate unit configured to be mounted on the body, the air dispersing plate unit including a bottom plate having at least one through hole, a first side plate formed on a first side of the bottom plate, and a second side plate formed on both a second side of the bottom plate, each of the first side plate and the second side plate having a plurality of ventholes;
 a power supply unit including a first power supply unit and a second power supply unit;
 a heating unit including a first power connecting unit configured to be connected to the first power supply unit;
 an air circulation unit arranged along a first long side of the body in a longitudinal direction thereof and including a second power connecting unit configured to be connected to the second power supply unit;
 a body connecting unit configured to be mounted on a first short side of the body in a direction perpendicular to the longitudinal direction and including a first connecting terminal configured to be connected to the second power connecting unit and contactable with the second power supply unit; and
 a cooking unit mounted above the heating unit and including a cooking surface configured to be heated by the heating unit.

\* \* \* \* \*